(12) United States Patent
Metke

(10) Patent No.: US 6,565,435 B2
(45) Date of Patent: May 20, 2003

(54) METHOD OF AUTHORIZING FREE PLAY OF AN AMUSEMENT GAME

(75) Inventor: Anthony R. Metke, Woodridge, IL (US)

(73) Assignee: Midway Amusement Games, LLC, Chicago, IL (US)

(*) Notice: Subject to any disclaimer, the term of this patent is extended or adjusted under 35 U.S.C. 154(b) by 0 days.

(21) Appl. No.: 09/726,165

(22) Filed: Nov. 29, 2000

(65) Prior Publication Data

US 2002/0065128 A1 May 30, 2002

Related U.S. Application Data

(60) Provisional application No. 60/168,090, filed on Nov. 30, 1999.

(51) Int. Cl.$^7$ .............................. A63F 13/00; G06F 17/00
(52) U.S. Cl. ............................................ 463/25; 463/41
(58) Field of Search .................................. 463/1, 25, 29, 463/37, 40, 41, 42, 39; 340/323 R, 7.29; 709/225, 226, 200, 203, 228, 250

(56) References Cited

U.S. PATENT DOCUMENTS 5,586,257 A * 12/1996 Perlman ........................ 463/42
6,264,561 B1 * 7/2001 Saffari et al. ................. 463/42
6,306,035 B1 * 10/2001 Kelly et al. .................... 463/25

OTHER PUBLICATIONS

Midway Tournament Network [Hot Hoops] Tournament #1 Official Rules, Midway Amusement Games LLC, 1999.

* cited by examiner

Primary Examiner—Kim Nguyen
(74) Attorney, Agent, or Firm—Jenkens & Gilchrist

(57) ABSTRACT

A method of permitting a player to play an amusement game at a given amusement game location free of charge includes the player transmitting information to an authorizing agent including information identifying at least one amusement game location. The authorizing agent creates free play authorization information and transmits the free play authorization information to one or more amusement games in the location identified by the player-transmitted information. The authorizing agent transmits to the player free play identifying information corresponding to the free play authorization information. One or more amusement games at the location identified by the player are responsive to the free play authorizing information for permitting at least one free play when corresponding free play identifying information is entered by a player.

6 Claims, 2 Drawing Sheets

METHOD OF AUTHORIZING FREE PLAY OF AN AMUSEMENT GAME

CROSS-REFERENCE TO RELATED APPLICATION

This invention claims priority to U.S. provisional patent application Serial No. 60/168,090, filed Nov. 30, 1999 and entitled "Method of Authorizing Free Play of an Amusement Game."

BACKGROUND OF THE INVENTION

The present invention relates generally to the field of amusement games, and more particularly to video games. More particularly still, the invention relates to a method of authorizing free play of a game for a particular player at a particular game arcade or other amusement location.

While the invention is described below with specific reference to authorizing free play of an amusement game in an amusement game tournament situation, the invention may be applicable to other situations as well. The specific examples given are for purposes of illustration and description only, and are not intended to limit the scope of the Invention.

In an amusement game tournament, a number of players may play one or more amusement games at any of a number of participating locations such as video arcades or other amusement game locations. The players may play the amusement games at different times and at locations in different cities, or the like, with the tournament extending over a period of several days. Generally speaking, in order to play in a tournament, the player may play one or more rounds of the amusement game or games at a participating tournament location. Upon completion of one or more games, the player will provide identifying information such as his or her name, address, social security number, and the like to create an entry into the tournament.

In accordance with the present invention, in addition to the above-described method of entry, participants may also enter by transmitting information to an authorizing agent or tournament sponsor who may arrange to authorize free play or free entry into the tournament for the player. The present invention is directed to a method of authorizing free play of an amusement game, whether in a tournament, or other situation. For example, such free play may also be authorized to promote a new amusement game, or a new arcade or other amusement game location, or the like.

SUMMARY OF THE INVENTION

The invention concerns a method of authorizing free play of an amusement game. Briefly, the method of permitting a player to play an amusement game at a given amusement game location free of charge, comprises the player transmitting information to an authorizing agent including information identifying at least one amusement game location, the authorizing agent creating free play authorization information and transmitting said free play authorization information to one or more amusement games in the location identified by the player-transmitted information, the authorizing agent transmitting to the player free play identifying information corresponding to said free play authorization information, and said one or more amusement games at said location identified by the player being responsive to said free play authorization information for permitting at least one free play when corresponding free play identifying information is entered by a player.

DETAILED DESCRIPTION OF THE ILLUSTRATED EMBODIMENT

Figure 1:
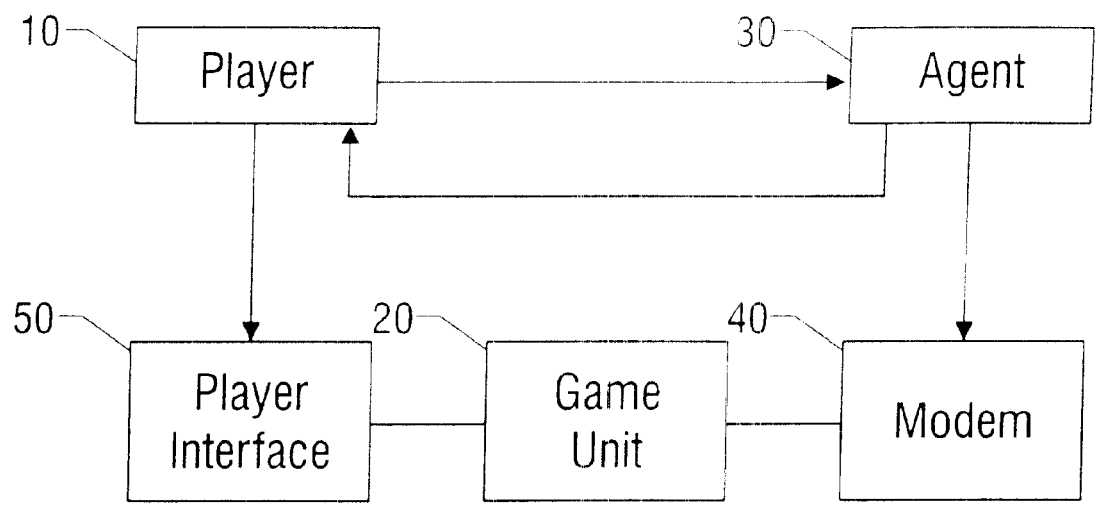
FIG. 1 is a functional block diagram illustrating the method of the invention in simplified form.

Referring now to the drawings, and initially to FIG. 1, a player 10 who wishes to play an amusement game at a game unit 20 at a given location transmits information to an authorizing agent 30. The information transmitted by the player 10 to the agent 30 may include information identifying the player and information identifying at least one amusement game location where the player wishes to engage in a free play of an amusement game such as the game unit 20.

The authorizing agent, in response to receipt of the information from the player 10, creates authorization information and transmits this information to at least one amusement game unit 20 in the location identified by the player 10. This information may be transmitted or "downloaded" to a modem 40 which is operatively coupled with the game unit 20. The agent 30 also transmits to the player 10 appropriate "free play" information corresponding to the authorization information sent to the game unit 20.

One or more amusement games, such as the game unit 20, will respond to authorization information received from the agent 30 so as to permit at least one free play when the corresponding "free play" information is entered by the player, such as player 10. In this regard, the player 10 may enter the appropriate information at a player interface 50 operatively coupled to the relative game unit 20.

In one embodiment, the player 10 may transmit information to the authorizing agent 30 by mail, including electronic mail (email) or by conventional post or other delivery service. This information may include player identification information and information identifying the type of game and/or a particular game unit 20. In the illustrative embodiment, the agent 30 transmits the authorizing information to one or more amusement game units such as the game unit 20 over a connection which may be a proprietary network, or simply a conventional telephone or internet connection via the modem 40 associated with the game unit 20. The corresponding "free play" information may be sent from the agent 30 to the player 10 by the same method used by the player to initially transmit information to the agent 30, that is by mail, whether by email or conventional post or other delivery service.

When the player enters the location where the game unit 20 which has received the authorizing information is located, the player enters the corresponding "free play" information received from the agent 30 or a player interface 50 of the game unit 20. This player interface 50 may comprise, without limitation, a touch screen, a controllable cursor moveable by the player relative to an onscreen menu or other display, a keyboard, or other means for permitting the player to enter the "free play" information into the game unit 20. The game unit 20 then compares the "free play" information entered by the player to authorization information previously received by the agent, and if the two correspond, permits at least one free play of the game.

Figure 2:
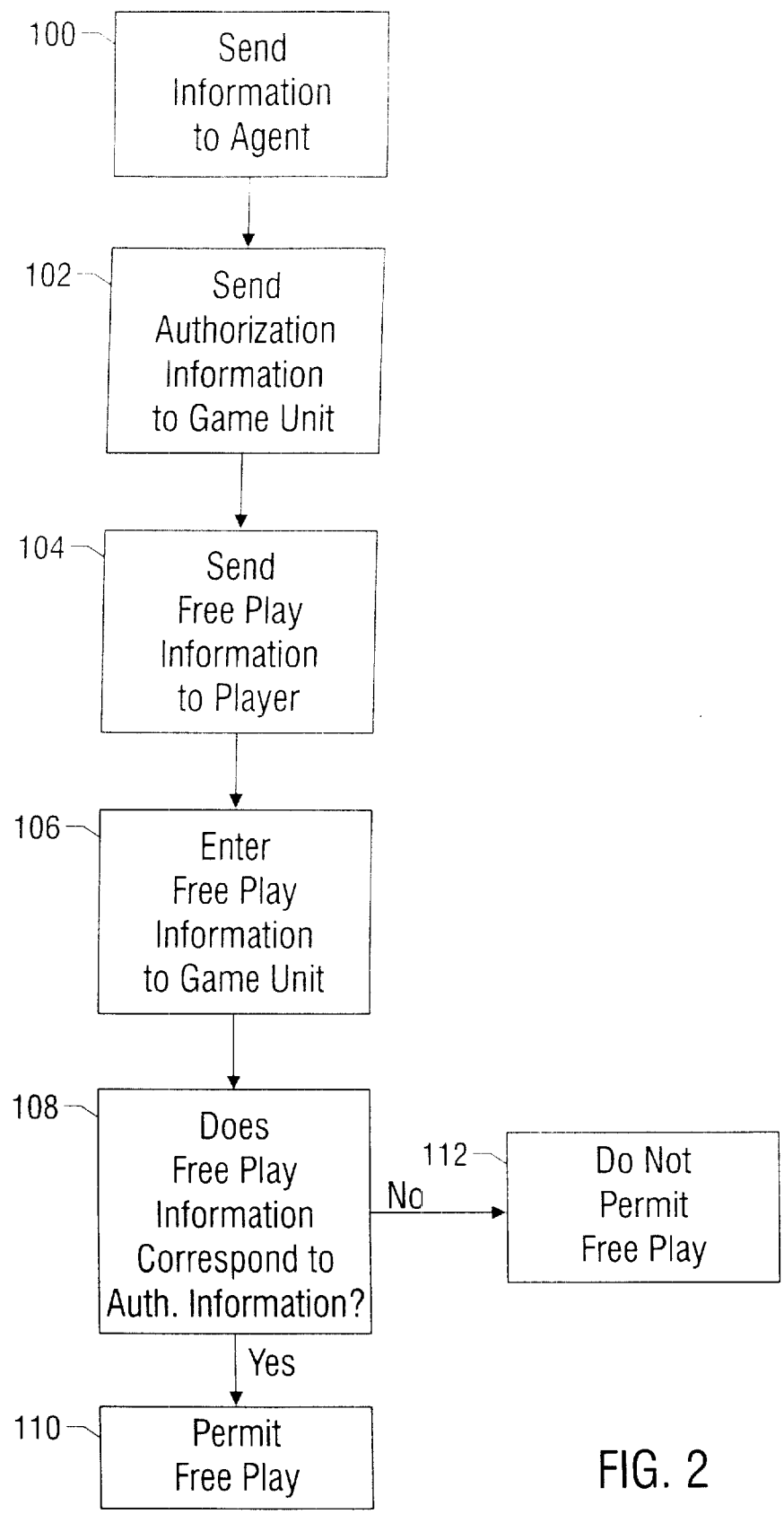
FIG. 2 is a flow chart illustrating one embodiment of the method of the invention.

Referring to FIG. 2, the flow chart illustrates generally the method described above with reference to FIG. 1. That is, initially the player sends information to the agent as indicated at block 100. At block 102, the agent sends the authorization information to the game unit. At block 104, the agent sends free play information corresponding to the authorization information to the player. At block 106, the player enters the free play information received from the agent to the game unit. At block 108, the game unit compares the free play information entered by the player to the authorization information received from the agent. If the two pieces of information correspond, the game unit permits free play as indicated at block 110. If the two pieces of information do not correspond, the game unit does not permit fee play as indicated at block 112.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A method of permitting a player to play an amusement game using a game unit at a given amusement game location free of charge, comprising:

transmitting information, independently of said game unit, from the player to an authorizing agent, including information identifying at least one amusement game location;

creating free play authorization information by the authorizing agent and transmitting said free play authorization information from the authorizing agent to one or more game units in the location identified by the player-transmitted information;

transmitting from the authorizing agent to the player free play identifying information corresponding to said free play authorization information; and after receiving said free play authorization information at said one or more game units at said location identified by the player, permitting at least one free play when said corresponding free play identifying information is entered to said one or more game units by the player.

2. The method of claim 1 wherein transmitting information from the player comprises sending information from the player to said authorizing agent by mail.

3. The method of claim 1 wherein transmitting information from the player further includes transmitting information identifying a type of game.

4. The method of claim 1 wherein transmitting information from the player includes transmitting information identifying a particular game unit.

5. The method of claim 1 wherein transmitting said free play authorization information from the authorizing agent to one or more game units comprises downloading data to said one or more game units through a modem.

6. The method of claim 1 wherein transmitting said free play identifying information from the authorizing agent to the player includes sending said information by mail.

* * * * *